United States Patent
Shiratori

(10) Patent No.: US 8,218,079 B2
(45) Date of Patent: Jul. 10, 2012

(54) STREAM GENERATING APPARATUS AND METHOD OF SUPPLYING FRAME SYNC SIGNAL USED FOR STREAM GENERATING APPARATUS

(75) Inventor: Masashi Shiratori, Kokubunji (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1615 days.

(21) Appl. No.: 11/516,768

(22) Filed: Sep. 7, 2006

(65) Prior Publication Data
US 2007/0058079 A1 Mar. 15, 2007

(30) Foreign Application Priority Data

Sep. 14, 2005 (JP) ................................. 2005-266944

(51) Int. Cl.
*H04N 9/475* (2006.01)
*H04N 11/04* (2006.01)

(52) U.S. Cl. ..................................... 348/516; 348/423.1

(58) Field of Classification Search .................. 348/423, 348/476, 384, 426, 460, 521, 523, 424, 524, 348/500, 516, 180, 194, 184, 420, 845.3, 348/845, 423.1, 515; 386/46, 125; 370/535, 370/392, 412, 428, 537, 468, 477
See application file for complete search history.

(56) References Cited

U.S. PATENT DOCUMENTS

| | | | | |
|---|---|---|---|---|
| 5,451,999 A | * | 9/1995 | Wesolowski | 348/180 |
| 5,610,983 A | * | 3/1997 | Stewart | 375/357 |
| 5,907,366 A | | 5/1999 | Farmer et al. | |
| 5,909,468 A | * | 6/1999 | Lawrence | 375/295 |
| 7,830,881 B2 | * | 11/2010 | Takatori et al. | 370/392 |
| 2002/0172281 A1 | * | 11/2002 | Mantchala et al. | 375/240.12 |
| 2003/0086442 A1 | | 5/2003 | Reynolds et al. | |
| 2005/0259946 A1 | * | 11/2005 | Kitamura | 386/46 |

FOREIGN PATENT DOCUMENTS

| | | |
|---|---|---|
| EP | 0 942 603 A2 | 3/1999 |
| EP | 1 067 795 A2 | 7/2000 |
| EP | 1 553 774 A1 | 7/2005 |
| JP | 2000-183863 | 6/2000 |

OTHER PUBLICATIONS

Office Action issued by the Canadian Intellectual Property Office in Canadian Patent Application No. 2,559,424, mailed Sep. 30, 2010 (3 pages).

* cited by examiner

*Primary Examiner* — Behrooz Senfi
(74) *Attorney, Agent, or Firm* — Finnegan, Henderson, Farabow, Garrett & Dunner, L.L.P.

(57) ABSTRACT

A stream generating apparatus includes an acquirer which acquires from an external source a reference signal synchronized with the video signal, a self-driven counter which has a first count mode in which the number of clocks in the frame period is counted in synchronization with a reference signal acquired by the acquirer thereby to generate and supply a first frame sync signal to the first and second signal processing units, and a second count mode in which the number of clocks in the frame period is counted independently not in synchronization with the reference signal thereby to generate and supply a second frame sync signal to the first and second signal processing units, and a controller which switches a count mode between either from the first count mode to the second count mode or from the second count mode to the first count mode based on predetermined conditions.

5 Claims, 1 Drawing Sheet

STREAM GENERATING APPARATUS AND METHOD OF SUPPLYING FRAME SYNC SIGNAL USED FOR STREAM GENERATING APPARATUS

CROSS-REFERENCE TO RELATED APPLICATIONS

This application is based upon and claims the benefit of priority from prior Japanese Patent Application No. 2005-266944, filed Sep. 14, 2005, the entire contents of which are incorporated herein by reference.

BACKGROUND OF THE INVENTION

1. Field of the Invention

The present invention relates to a stream generating apparatus for generating a TS (Transport Stream) from the video signal in accordance with, for example, MPEG2 (Moving Picture Experts Group 2) and a method of supplying a frame sync signal used for the stream generating apparatus.

2. Description of the Related Art

In digital broadcasting, the studio equipment for the signal processing such as encoding the video signal in accordance with MPEG2 and TS multiplexing are essential. Also, digital broadcasting requires more delicate and accurate processing than analog broadcasting. To meet this requirement, the BB (Black Burst) reference sync signal for the video signal is introduced from an external source to generate a frame sync signal, and each piece of studio equipment is controlled with this frame sync signal.

In the case where the BB reference sync signal is at fault, however, the intervals of the frame sync signal become irregular, whereby data drop-off or duplication of the video signal, frame drop-off, abnormal encoding rate, abnormal output rate, buffer breakdown, or the like is caused. These situations result in an abnormal TS.

A conventional method, which uses a flywheel counter to independently generate a local frame sync signal, is used in the case where the sync information failed to be acquired in the studio equipment (for example, Jpn. Pat. Appln. KOKAI Publication No. 2000-183863).

Even the method using the flywheel counter, however, requires the adjustment of the flywheel counter, and this adjustment incurs troublesome manual work on the part of the operator.

BRIEF SUMMARY OF THE INVENTION

Accordingly, it is an object of this invention to provide a stream generating apparatus capable of protecting a generated stream from disruption in the case of a fault of a reference signal from an external source, and a method of supplying a frame sync signal used with the stream generating apparatus.

According to an aspect of the present invention, there is provided A stream generating apparatus in which the video signal of a frame structure is input and encoded by a first signal processing unit at the timing of a frame sync signal, and a stream having a header field and an information field is generated by a second signal processing unit at the timing of the frame sync signal, comprising: an acquirer which acquires from an external source a reference signal synchronized with the video signal; a self-driven counter which has a first count mode in which the number of clocks in the frame period is counted in synchronization with a reference signal acquired by the acquirer thereby to generate and supply a first frame sync signal to the first and second signal processing units, and a second count mode in which the number of clocks in the frame period is counted independently not in synchronization with the reference signal thereby to generate and supply a second frame sync signal to the first and second signal processing units; and a controller which switches a count mode between either from the first count mode to the second count mode or from the second count mode to the first count mode based on predetermined conditions.

According to another aspect of the present invention, there is provided a method of supplying a frame sync signal used for a stream generating apparatus in which the video signal having a frame structure is input and encoded by a first signal processing unit at the timing of a frame sync signal, and a stream having a header field and an information field is generated by a second signal processing unit at the timing of the frame sync signal, the method comprising: executing a first count mode in which a reference signal synchronized with the video signal from an external source is supplied to a self-driven counter, and the number of clocks in the frame period is counted in synchronization with the reference signal by the self-driven counter thereby to generate and supply a first frame sync signal to the first and second signal processing units before the first and second signal processing units start processing of the video signal; and executing a second count mode in which the number of clocks in the frame period is counted independently not in synchronization with the reference signal by the self-driven counter thereby to generate and supply a second frame sync signal to the first and second signal processing units at the time when the first and second signal processing units start processing of the video signal.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

An embodiment of the present invention will be explained in detail below with reference to the drawings.

Figure 1:
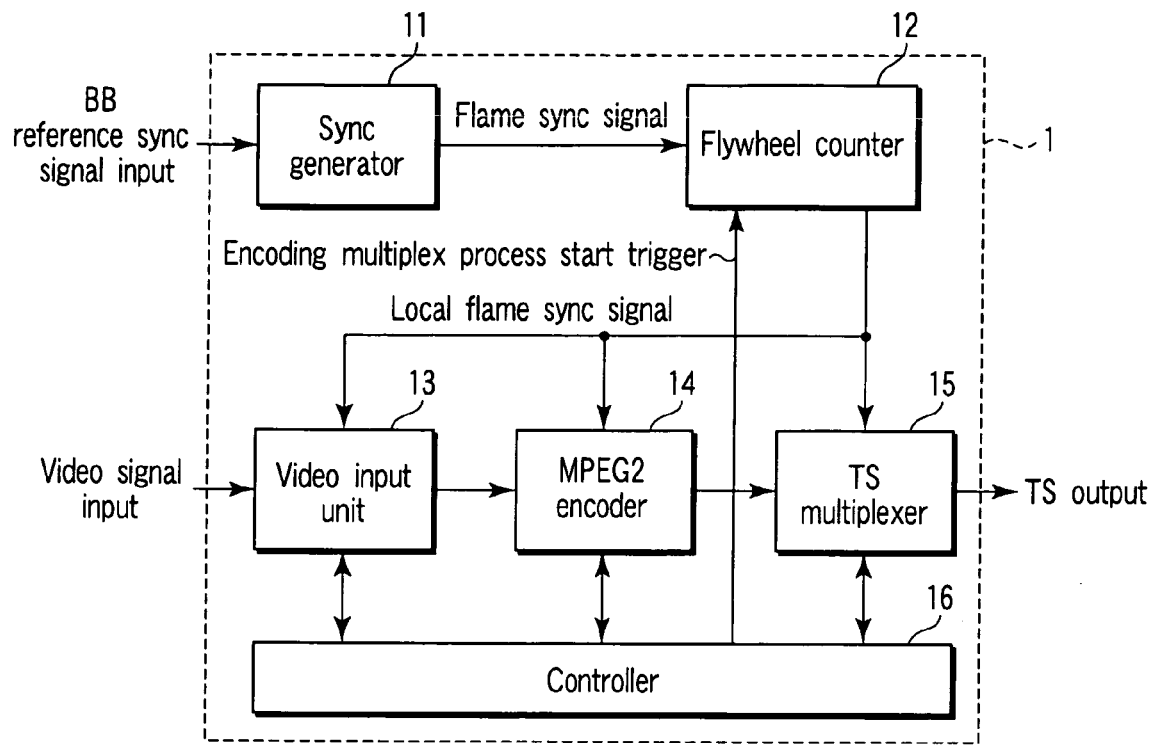
FIG. 1 is a block diagram showing an MPEG2 encoding multiplexer constituting a stream generating apparatus according to an embodiment of this invention.

FIG. 1 is a block diagram showing an MPEG2 encoding multiplexer constituting a stream generating apparatus according to an embodiment of this invention.

In FIG. 1, reference numeral 1 designates an MPEG2 encoding multiplexer including a sync generator 11, a flywheel counter 12, a video input unit 13, an MPEG2 encoder 14, a TS multiplexer 15 and a controller 16. The sync generator 11 is supplied with a BB reference sync signal from an external source and generates an external frame sync signal in synchronism with the BB reference sync signal.

In the MPEG2 encoding multiplexer 1, the frame sync signal, acquired in the flywheel counter 12 by counting the number of clocks in one frame period, is synchronized with the external frame sync signal. The frame sync signal obtained by the flywheel counter 16 is applied to the video input unit 13, the MPEG2 encoder 14 and the TS multiplexer 15 and used for respective signal processing.

The video input unit 13 retrieves the video signal, transfers it to the MPEG2 encoder 14, and notifies the control unit 16 that the video input unit 13 encodes the video signal after complete transfer.

The controller 16, based on the notification from the video input unit 13, outputs an encoding multiplex process start trigger to the flywheel counter 12. Also, the MPEG2 encoder 14 encodes the video signal under the control of the controller 16, and outputs the encoded data to the TS multiplexer 15.

The TS multiplexer 15 analyzes the data encoded by the controller 16 and calculates the contents of the TS header and the adaptation field, which contents are written in a buffer thereby to generate the TS. The encoded data itself is placed in the payload field of TS.

The flywheel counter 12 has a first count mode and a second count mode. In the first count mode, the number of clocks in one frame period is counted in synchronism with the external frame sync signal thereby to generate a frame sync signal, which is supplied to the video input unit 13, the MPEG2 encoder 14 and the TS multiplexer 15. In the second count mode, on the other hand, the external frame sync signal is masked and the number of clocks in one frame period is dependently counted thereby to generate the local frame sync signal, which is supplied to the video input unit 13, the MPEG2 encoder 14 and the TS multiplexer 15. Once the encoding multiplex process start trigger is supplied from the controller 16, the count mode is switched from the first count mode to the second count mode. Based on the encoding multiplex process end notification from the controller 16, on the other hand, the masking of the external frame sync signal is canceled, and by switching from the second count mode to the first count mode, the counting operation is again synchronized with the external sync signal.

Next, the processing operation with the aforementioned configuration is explained below.

In the prior art, the MPEG2 encoding multiplexer 1 has retrieved the BB reference sync signal of the video signal from an external source, generated a frame sync signal, and controlled the video input unit 13 using the frame sync signal, the MPEG2 encoder 14 and the TS multiplexer 15. In this case, once an error is caused in the BB reference sync signal, the intervals of the external frame sync signal supplied from the sync generator 11 would become irregular, thereby data drop-off or duplication of the video signal output from the video input unit 13, frame drop-off and abnormal encoding rate in the MPEG2 encoder 14, abnormal output rate in the TS multiplexer 15, disruption of the buffer, or the like was caused. These situation have resulted in an abnormal TS.

In view of this, according to this embodiment, the count mode of the flywheel counter 12 is switched in accordance with the processing conditions of the video input unit 13, the MPEG2 encoder 14 and the TS multiplexer 15.

Figure 2:
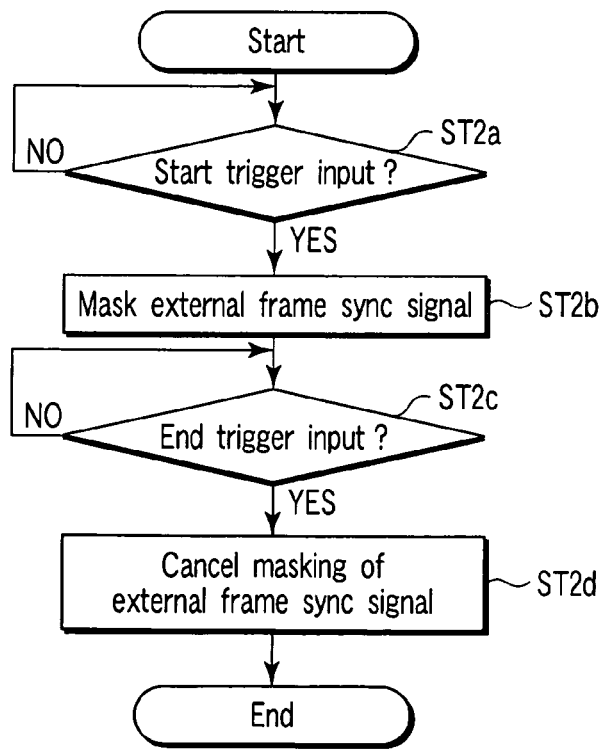
FIG. 2 is a flowchart showing the control processing steps of the flywheel counter shown in FIG. 1.

First, the flywheel counter 12 executes the counting process in synchronization with the external frame sync signal from the sync generator 11. FIG. 2 is a flowchart showing the control process of the flywheel counter 12.

The flywheel counter 12 monitors the arrival of the encoding multiplex process start trigger from the controller 16 (step ST2*a*), and with the arrival of the start trigger (Yes), masks the external frame sync signal and independently executes the counting process (step ST2*b*).

Under this condition, the flywheel counter 12 monitors the arrival of an encoding multiplex process end trigger from the controller 16 (step ST2*c*), and with the arrival of the encoding multiplex process end trigger (Yes), cancels the masking of the external frame sync signal and executes the counting process again in synchronization with the external frame sync signal (step ST2*d*).

As described above, according to this embodiment, the local frame sync signal, independently generated by the flywheel counter 12 during the processing of the video signal by the video input unit 13, the MPEG2 encoder 14 and the TS multiplexer 15, is supplied to the video input unit 13, the MPEG2 encoder 14 and the TS multiplexer 15. In the case where the video signal is not processed by the video input unit 13, the MPEG2 encoder 14 and the TS multiplexer 15, on the other hand, the frame sync signal based on the BB reference sync signal from an external source is supplied from the flywheel counter 12 to the video input unit 13, the MPEG2 encoder 14 and the TS multiplexer 15. In this way, the optimum frame sync signal is supplied for each processing condition of the video input unit 13, the MPEG2 encoder 14 and the TS multiplexer 15.

Therefore, even in the case where an error exists in the BB reference sync signal from an external source during the processing of the video signal by the video input unit 13, the MPEG2 encoder 14 and the TS multiplexer 15, the local frame sync signal remains unchanged, thereby having no effect on the video input unit 13, the MPEG2 encoder 14 and the TS multiplexer 15. Thus, the stream remains generated with no fault.

During the processing of the video signal carried out except by the video input unit 13, the MPEG2 encoder 14 and the TS multiplexer 15, on the other hand, the frame sync signal generated from the flywheel counter 12 is adjusted automatically based on the BB reference sync signal from the external source, and therefore the flywheel counter 12 can be used for a long time without human labor.

Although this embodiment uses the BB reference sync signal, a reference signal in synchronization with the video signal other than the BB reference sync signal may be used with equal effect.

Also, in the aforementioned embodiment, the count mode is switched from the first count mode to the second count mode using the encoding multiplex process start trigger. This invention, however, is not limited to this configuration, and the count mode can be switched from the first count mode to the second count mode under other conditions. Further, instead of switching from the second count mode to the first count mode using the encoding multiplex process end trigger as described above, the count mode can be switched from the second count mode to the first count mode under other conditions.

Also, in the configuration of the MPEG2 encoding multiplexer, in the way of defining the stream other than with the MPEG2 encoding scheme, in the selection of a self-driven counter other than the flywheel counter used, or in the way of switching the counter mode of the flywheel counter, various modifications can be implemented without departing from the scope and spirit of the invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A stream generating apparatus in which the video signal of a frame structure is input and encoded by a first signal processing unit at the timing of a frame sync signal, and a stream including a header field and an information field is generated by a second signal processing unit at the timing of the frame sync signal, comprising:
    an acquirer configured to acquire from an external source a reference signal synchronized with the video signal;
    a self-driven counter configured to include a first count mode in which the number of clocks in the frame period is counted independently and asynchronously with the reference signal thereby to generate and supply a frame sync signal to the first and second signal processing units, and a second count mode in which the frame sync signal is adjusted automatically based on the reference signal acquired by the acquirer; and
    a controller configured to switch a count mode from the second count mode to the first count mode when the first and second signal processing units start processing of the video signal.

2. A stream generating apparatus according to claim 1, wherein
    the controller switches the count mode from the first count mode to the second count mode when the first and second signal processing units end processing of the video signal.

3. A stream generating apparatus according to claim 1,
    wherein the acquirer is supplied with a BB (Black Burst) signal from an external source and generates the reference signal based on the BB signal.

4. A method of supplying a frame sync signal used for a stream generating apparatus in which the video signal including a frame structure is input and encoded by a first signal processing unit at the timing of a frame sync signal, and a stream including a header field and an information field is generated by a second signal processing unit at the timing of the frame sync signal, the method comprising:
    executing a first count mode in which the number of clocks in the frame period is counted independently and asynchronously with the reference signal by the self-driven counter thereby to generate and supply a frame sync signal to the first and second signal processing units when the first and second signal processing units start processing of the video signal; and
    executing a second count mode in which a reference signal synchronized with the video signal from an external source is supplied to a self-driven counter, and the frame sync signal is adjusted automatically based on the reference signal.

5. A method of supplying a frame sync signal according to claim 4,
    further comprising switching a mode of the self-driven counter from the first count mode to the second count mode when the first and signal processing units end processing of the video signal.

* * * * *